(12) United States Patent
Philpott et al.

(10) Patent No.: US 9,199,624 B2
(45) Date of Patent: Dec. 1, 2015

(54) METHOD OF CONTROLLING A BRAKE SYSTEM OF A VEHICLE

(71) Applicant: ArvinMeritor Technology, LLC, Troy, MI (US)

(72) Inventors: Daniel Philpott, Oxford, MI (US); Joseph Kay, Highland, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 113 days.

(21) Appl. No.: 13/740,395

(22) Filed: Jan. 14, 2013

(65) Prior Publication Data

US 2013/0211683 A1    Aug. 15, 2013

Related U.S. Application Data

(60) Provisional application No. 61/596,934, filed on Feb. 9, 2012.

(51) Int. Cl.
| | |
|---|---|
| *B60T 7/00* | (2006.01) |
| *B60T 17/22* | (2006.01) |
| *F16D 65/38* | (2006.01) |
| *B60T 7/16* | (2006.01) |
| *B60T 7/18* | (2006.01) |
| *F16D 66/02* | (2006.01) |

(52) U.S. Cl.
CPC ............. *B60T 17/221* (2013.01); *B60T 7/00* (2013.01); *B60T 7/16* (2013.01); *B60T 7/18* (2013.01); *F16D 65/38* (2013.01); *F16D 66/026* (2013.01); *B60T 2210/16* (2013.01); *B60T 2270/406* (2013.01)

(58) Field of Classification Search
CPC ..... B60T 17/221; B60T 2210/16; B60T 7/18; B60T 7/16; B60T 7/00; B60T 2270/406; F16D 66/026; F16D 65/38
See application file for complete search history.

(56) References Cited

U.S. PATENT DOCUMENTS

| 5,431,242 A | * | 7/1995 | Iwata et al. | ................ 180/197 |
| 7,246,690 B2 | | 7/2007 | McCann | |
| 7,380,644 B2 | | 6/2008 | Ward et al. | |
| 2008/0251326 A1 | | 10/2008 | Lundskog | |

FOREIGN PATENT DOCUMENTS

| CN | 1982738 A | 6/2007 | |
| CN | 101802436 A | 8/2010 | |
| JP | 4482843 B2 | 10/2001 | |
| JP | 2001343036 A | * 12/2001 | ............. F16D 65/18 |
| JP | 4248729 B2 | 4/2009 | |
| KR | 20030082716 A | 10/2003 | |

OTHER PUBLICATIONS

Machine Translation of JP 2001-343036.*
CarCare.org, Car Brakes: How Do You Know When to Change Them?, Oct. 5, 2011, http://www.carcare.org/2011/10/car-brakes-how-do-you-know-when-to-change-them/.*
Touma, JP2001-343036, machine translation of drawings.*
Chinese Patent Office, Office Action for the corresponding Chinese Patent Application No. 201310044957.1 mailed Feb. 4, 2015.

* cited by examiner

*Primary Examiner* — John Q Nguyen
*Assistant Examiner* — Alan D Hutchinson
(74) *Attorney, Agent, or Firm* — Brooks Kushman P.C.

(57) ABSTRACT

A method of controlling a brake system of a vehicle. The method may include determining whether an environmental brake pad wear condition is detected that may be indicative of wear of a friction material of a brake pad assembly due to an environmental contaminant.

20 Claims, 2 Drawing Sheets

METHOD OF CONTROLLING A BRAKE SYSTEM OF A VEHICLE

CROSS-REFERENCE TO RELATED APPLICATIONS

This application claims the benefit of U.S. provisional application No. 61/596,934, filed Feb. 9, 2012, the disclosure of which is incorporated in its entirety by reference herein.

TECHNICAL FIELD

The present application relates to a method of controlling a brake system of a vehicle.

BACKGROUND

An air disc brake adjuster is disclosed in U.S. Pat. No. 7,246,690.

SUMMARY

In at least one embodiment, a method of controlling a brake system of a vehicle is provided. The method may include determining whether an environmental brake pad wear condition is detected. Clearance between a friction material of a brake pad assembly and a brake friction member may be checked when the environmental brake pad wear condition is detected.

In at least one embodiment, a method of controlling a brake system of a vehicle is provided. The method may include actuating a brake pad assembly against a friction brake member of the brake system. The method may also determine whether an environmental brake pad wear is detected based on actuation of the brake pad assembly. Environmental brake pad wear may be indicative of wear of a friction material of the brake pad assembly by an abrasive slurry through which the vehicle is driven.

In at least one embodiment, a method of controlling a brake system of a vehicle is provided. The method may include providing a set of friction brakes, determining whether an environmental brake pad wear condition exists, and checking the clearance between a friction material and a brake friction member when the environmental brake pad wear condition exists. Each member of the set of friction brakes may be configured to brake a different member of a set of wheel assemblies. An environmental brake pad wear condition may exist when an abrasive slurry through which the vehicle is driven passes between a friction material and a brake friction member of a member of the set of friction brakes to wear the friction material.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
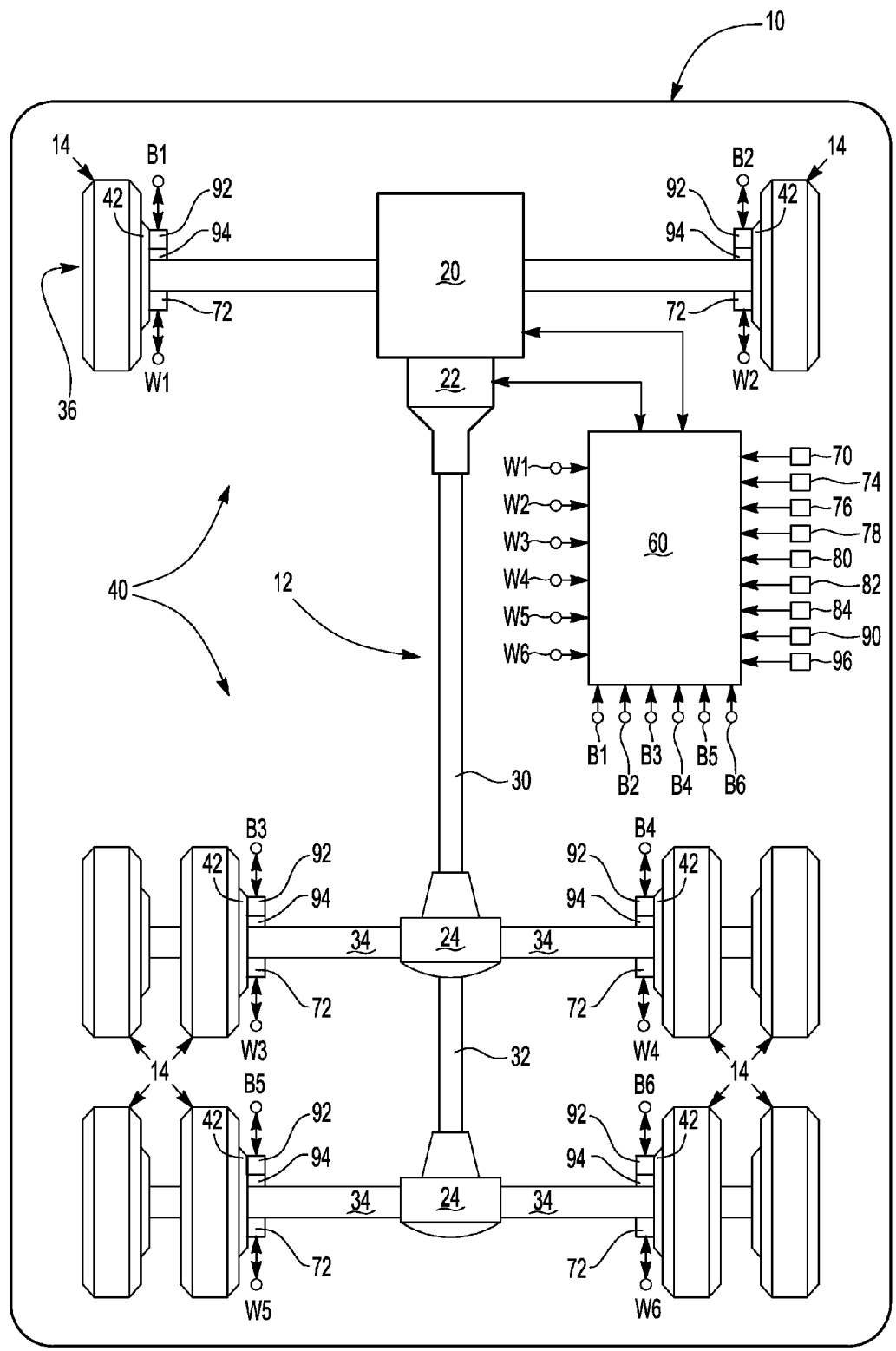
FIG. 1 is a schematic of an exemplary vehicle having a brake system.

Referring to FIG. 1, an exemplary vehicle 10 is shown. The vehicle 10 may be a motor vehicle like a truck, farm equipment, or military transport or weaponry vehicle. The vehicle 10 may include a trailer for transporting cargo in one or more embodiments.

The vehicle 10 may have a drivetrain 12 that may provide torque to one or more wheel assemblies 14 to propel the vehicle 10. The drivetrain 12 may have a hybrid configuration that may employ multiple power sources or a non-hybrid configuration. In a non-hybrid configuration, the drivetrain 12 may include an engine 20, a transmission 22, and at least one drive axle assembly 24.

The engine 20 may provide power that may be used to rotate one or more wheel assemblies 14. For example, the vehicle 10 may have a set of wheel assemblies 14 that may include a tire mounted on a wheel. In at least one embodiment, the engine 20 may be configured as an internal combustion engine that may be adapted to combust any suitable type of fuel, such as gasoline, diesel fuel, or hydrogen.

The transmission 22 may be coupled to or may be driven by the engine 20. The transmission 22 may be of any suitable type, such as a multi-gear "step ratio" transmission as is known by those skilled in the art. As used herein, the term transmission may also encompass or include a transfer case that may provide multi-wheel drive or all-wheel drive capability. For simplicity, a separate transfer case is not shown in FIG. 1.

A drive axle assembly 24 may rotatably support one or more wheel assemblies 14. In FIG. 1, two drive axle assemblies 24 are shown a tandem axle configuration, although it is contemplated that a greater or lesser number of drive axle assemblies 24 may be provided. In a tandem configuration, the drive axle assemblies 24 may be designated as a forward-rear drive axle assembly and a rear-rear drive axle assembly. An output of the transmission 22 may be coupled to an input of the forward-rear axle assembly 24 with a drive shaft 30. An output of the forward-rear drive axle assembly 24 may be selectively coupled to an input of the rear-rear drive axle assembly 24, if provided, via a prop shaft 32. Each drive axle assembly 24 may each have at least one output that may be coupled to a wheel assembly 14. For example, each drive axle assembly 24 may be coupled to a corresponding wheel axle 34 or half-shaft upon which one or more wheel assemblies 14 may be disposed.

The vehicle 10 may also include a front axle assembly 36 that may be configured to steer the vehicle 10. The front axle assembly 36 may or may not be configured as a drive axle that provides torque to at least one associated wheel assembly 14.

Figure 2:
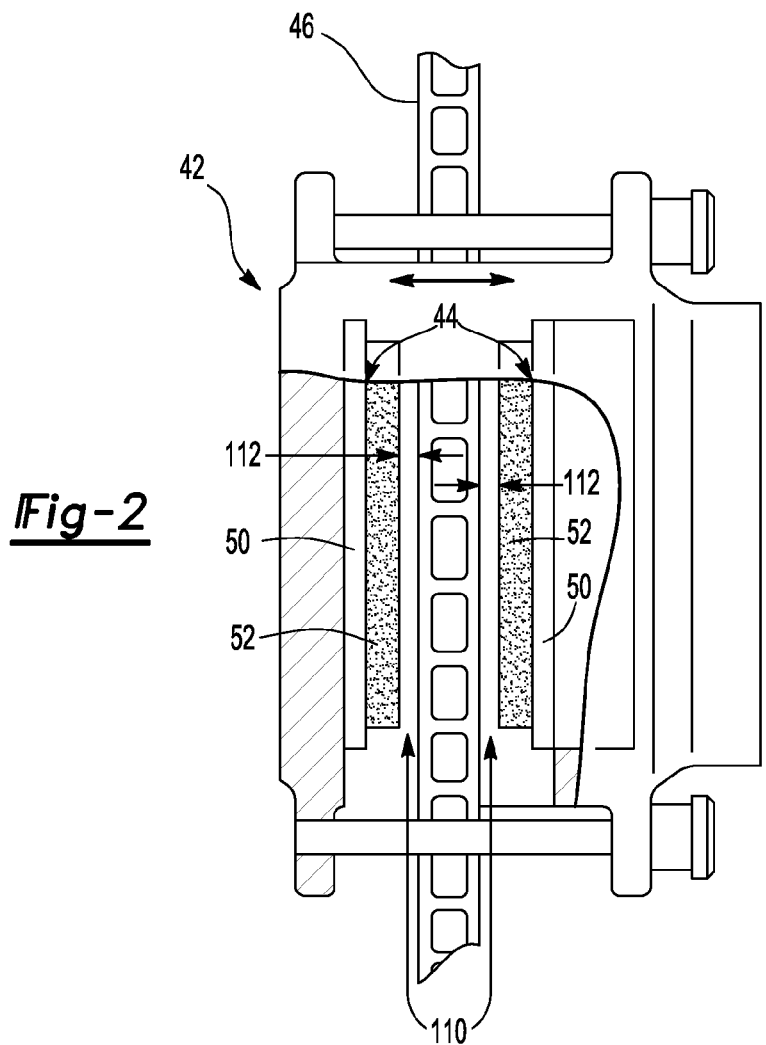
FIG. 2 is an example of a friction brake that may be provided with the brake system.

Referring to FIGS. 1 and 2, a brake system 40 may be provided with the vehicle 10. The brake system 40 may include a set of friction brakes 42 that may be configured to slow or inhibit rotation of at least one associated wheel assembly 14. Each friction brake 42 may include at least one brake pad assembly 44 and a brake friction member 46. A brake pad assembly 44 may engage the brake friction member 46 when braking is requested and may be spaced apart from the brake friction member 46 when braking is not requested. As such, the brake friction member 46 may rotate with a wheel assembly 14 and with respect to a brake pad assembly 44 when braking is not requested. The friction brake 42 may not be a sealed or "dry" brake in which the interface between the brake pad assembly 44 and brake friction member 46 is separated or sealed off from the surrounding environment. As such, the brake pad assembly 44 may be exposed to and may be eroded or worn by an environmental contaminant as will be discussed in more detail below.

The friction brakes 42 may have any suitable configuration. For example, each friction brake 42 may be configured as a drum brake or a disc brake. FIG. 2 shows an example of a disc brake. In a disc brake configuration, the brake friction member 46 may be configured as a rotor and first and second brake pad assemblies 44 may be configured to engage opposite sides of the rotor to slow the rotation of a wheel assembly 14. In a drum brake configuration, the brake friction member 46 may be a brake drum that extends completely around first and second brake pad assemblies 44 that may be configured to engage the brake drum to slow rotation of a wheel assembly 14. The brake drum may be disposed between a wheel assembly 14 and a wheel hub assembly that rotatably supports the wheel assembly 14.

Each brake pad assembly 44, which may also be called a brake shoe, brake pad, or brake block, may include a backing plate 50 and a friction material 52. The backing plate 50 may be a structural member of a brake pad assembly 44. The friction material 52, which may also be called a brake lining, may be disposed on the backing plate 50 and may face toward the brake friction member 46. The friction material 52 may engage the brake friction member 46 during vehicle braking and may be spaced apart from the brake friction member 46 when the friction brake 42 is not being applied.

The brake system 40 may use any suitable actuator or actuation system to actuate the brake pad assemblies 44. For example, a pneumatic, hydraulic, electrical, or electromechanical actuation system may be employed as are known by those skilled in the art.

One or more controllers or control modules 60 may be provided to monitor and control various components and systems of the vehicle 10. For example, the control module 60 may be electrically connected to or communicate with components of the drivetrain 12, such as the engine 20 and transmission 22, to monitor and control their operation and performance. For example, the control module 60 may receive data indicative of engine speed or a selected transmission or transfer case gear ratio of the drivetrain 12. The control module 60 may also monitor and control the brake system 40 as will be discussed in more detail below. In addition, the control module 60 may also process input signals or data from various input devices or sensors. Input devices that may be provided with the vehicle 10 may include an ignition sensor 70, a speed sensor 72, one or more suspension sensors 74, a vehicle load sensor 76, an inclinometer 78, an environmental contaminant sensor 80, an antenna 82, and an operator communication device 84.

The ignition sensor 70 may provide data indicative of a "key-on" or operating state of the vehicle 10. For example, the ignition sensor 70 may be used to determine whether the engine 20 is running or the vehicle 10 is operational.

The speed sensor 72 may be provided to detect or provide data indicative of the speed of the vehicle 10. The speed sensor 72 may be of any suitable type. For example, the speed sensor 72 may be configured as a wheel speed sensor that detects the rotation speed of a wheel assembly 14 or associated wheel axle 34. Data from the speed sensor 72 may also be used to determine a distance of travel of the vehicle 10. For instance, distance of travel may be based on tire size (e.g., tire diameter) and the rotational distance or number of revolutions detected by the speed sensor 72. In at least one embodiment, a speed sensor 72 may be associated with each wheel assembly 14 or wheel axle 34, such as may be provided with an anti-lock brake system or traction control system. As such, the speed sensor 72 may detect wheel slip or unexpected rotation of a wheel assembly 14 in a manner known by those skilled in the art. Communication between the control module 60 and each speed sensor 72 is represented by connection nodes W1 through W6 in FIG. 1.

One or more suspension sensors 74 may be provided as part of a suspension system of the vehicle 10. The suspension system may interconnect and allow relative motion between a chassis or frame of the vehicle 10 and a wheel assembly 14. A suspension sensor 74 may be used to monitor and/or control suspension performance characteristics. For instance, a suspension sensor 74 may detect magnitude (e.g., distance) of travel and/or frequency of travel of a wheel assembly 14 or a suspension component, such as a control arm, axle, or the like. As such, data from the suspension sensor 74 may be used to predict or determine whether a particular wheel assembly 14 is traveling in an off-road environment in which an associated friction brake 42 may be exposed to or driven through an environmental contaminant. In addition or alternatively, the suspension sensor 74 may be an air spring pressure sensor that may detect the pressure of a pressurized fluid, such as compressed air, that is provided to an air spring of a vehicle suspension system. Data from one or more air spring pressure sensors may be used to detect the mass or weight of the vehicle 10.

The vehicle load sensor 76, if provided, may also be used to detect the mass or weight of the vehicle 10. The vehicle load sensor 76 may be of any suitable type. For example, the vehicle load sensor 76 may be associated with the suspension system as previously described. A vehicle load sensor 76 may be omitted in one or more embodiments, such as when vehicle weight data is manually entered by a vehicle operator, wirelessly transmitted to the vehicle 10, or provided as a predetermined value, such as when the vehicle weight may far exceed occupant and/or cargo weight.

An inclinometer 78 may be provided for detecting, measuring, and/or determining an angle of slope or inclination of the vehicle 10. Such measurements may be indicative of a road grade or slope of a surface upon which the vehicle 10 is disposed. The inclinometer 78 may be an on-vehicle inclinometer, a virtual inclinometer, or combinations thereof. For example, a virtual inclinometer may include or may be based on data provided by a global positioning system (GPS) or vehicle location data in combination with land terrain data. In at least one embodiment, the inclinometer 78 may provide data indicative of the number of degrees at which the vehicle 10 is inclined or declined with respect to an artificial horizon.

The environmental contaminant sensor 80 may provide data indicative of the presence of an environmental contaminant proximate a wheel assembly 14 and/or friction brakes 42. In at least one embodiment, the environmental contaminant sensor 80 may detect an environmental contaminant, such as an abrasive slurry, that may rapidly erode or wear the friction material 52 of a brake pad assembly 44. For example, an abrasive slurry may include particulate matter or granular matter suspended in a liquid or provided in a semi-solid form, such as mud, sludge, or muck. The environmental contaminant sensor 80 may detect such an environmental contaminant based on pressure exerted by the environmental contaminant (e.g., an abrasive slurry, mud, sludge, or the like may have a greater density that air or water), proximity of an environmental contaminant to a brake pad assembly 44, submersion depth (such as when a wheel assembly 14 or friction brake 42 is at least partially submerged in an environmental contaminant), or combinations thereof.

The antenna 82 may be used to wirelessly receive data from a data source external to the vehicle 10. External data may indicate the presence of an environmental contaminant proximate the vehicle 10. For instance, the antenna 82 may be used to receive GPS data indicative of vehicle speed or location and/or ground terrain, which may be used to determine whether the vehicle 10 is travelling off-road. In addition, the antenna 82 may be used to receive data from another vehicle located nearby, such as another vehicle in a convoy, that may indicate whether the convoy or convoy member may be travelling off-road or through an environmental contaminant.

The operator communication device 84 may be provided to receive an input from an operator. The operator communication device 84 may be of any suitable type or types, such as a switch, button, sensor, display, touchscreen, voice command or speech recognition system, or the like. The operator communication device 84 may be used to input data that may not be predetermined or provided by a sensor or other input device, such as may be the case when a vehicle 10 is not equipped with one or more of the sensors discussed herein. For example, the operator communication device 84 may facilitate entry of information regarding vehicle weight, selection of an off-road drive mode or all-wheel drive mode, an electronic clearance control system setting, windshield wiper activation, selection of a particular drive gear, or a manual input regarding the presence of an environmental contaminant or that the vehicle 10 is being driven through an environmental contaminant.

The control module 60 may also monitor and control the brake system 40. For example, the control module 60 may monitor and control the amount of brake torque provided by each friction brake 42. In addition, the control module 60 may also receive or process input signals or data from various input devices or sensors associated with the brake system 40 such as a brake pedal sensor 90, a brake temperature sensor 92, a brake load sensor 94, and a brake pressure sensor 96. Communication between the control module 60 and each friction brake 42 or sensors associated with a friction brake 42 is represented by connection nodes B1 through B6 in FIG. 1.

A brake pedal sensor 90 may be provided to detect a braking command or brake input command that may be provided by a vehicle driver or vehicle operator. For example, the brake pedal sensor 90 may detect the position of a brake pedal or the position or operating state of a component that is connected to or operated by a brake pedal, such as a treadle valve that may modulate a control fluid pressure that is provided to a relay valve that may control the supply of fluid to one or more brake actuators. The detected position of the brake pedal may be used to control the brake torque provided by the brake system 40. For example, depending on the configuration of the brake system 40 the control module 60 may control operation of a valve that controls fluid pressure provided to a friction brake 42, a brake pump that pressurizes fluid, or an electric motor that actuates a brake pad assembly 44. Fluid pressure output or electric motor actuation may be proportional to a detected angle of motion or degree of actuation of the brake pedal.

A brake temperature sensor 92 may detect or provide data indicative of a temperature of a portion of the brake system 40, such as the brake pad assembly 44. The brake temperature sensor 92 may be used to detect unexpected wear of friction material 52 due to an environmental contaminant as will be discussed in more detail below.

A brake load sensor 94 may be provided to detect or provide data indicative of a load force exerted on part of a friction brake 42, such as a brake pad assembly 44. The brake load sensor 94 may be of any suitable type, such as a load cell. The brake load sensor 94 may detect a load force exerted by an environmental contaminant as will be discussed in more detail below.

A brake pressure sensor 96 may be provided to detect fluid pressure that is provided to control or actuate a friction brake 42. For example, a pressurized fluid such as compressed air or hydraulic fluid may be used to actuate the friction brake 42.

Figure 3:
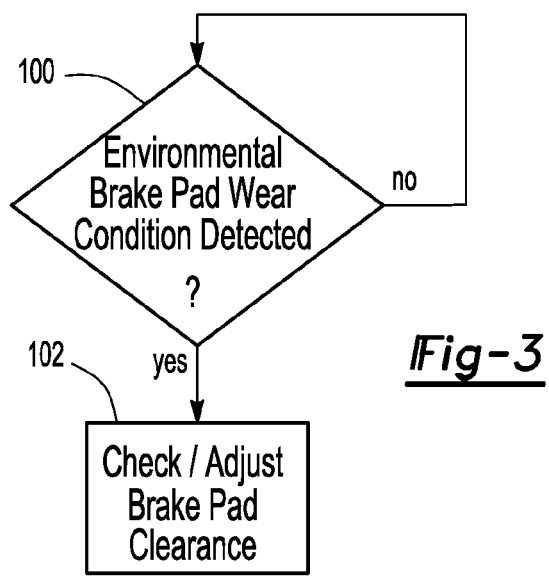
FIG. 3 is a flowchart of a method of controlling a brake system.

Referring to FIG. 3, a flowchart of an exemplary method of controlling a vehicle brake system 40 is shown. As will be appreciated by one of ordinary skill in the art, the flowcharts may represent control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multitasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the spirit or scope of the present invention.

In at least one embodiment, a method may be executed by the control module 60 and may be implemented as a closed loop control system. Moreover, the method may be enabled or disabled based on the operating state of the vehicle 10 and/or which drivetrain gear ratio is selected. For example, the method may be disabled if the vehicle 10 is not running or a key-on condition is not present, which may be based on data from the ignition sensor 70. In addition the method may be disabled if a predetermined drivetrain gear ratio, such as a gear ratio of the transmission 22 or transfer case is not selected. For instance, a low forward drivetrain gear ratio may be selected or engaged when the vehicle 10 is partially submerged or traveling through an environmental contaminant. As such, the method may be enabled when a low forward gear ratio is selected and/or when the vehicle 10 is in motion. In addition, the method may be utilized with a brake system or portion thereof that is associated with a drive axle or a non-drive axle and with a steerable or non-steerable axle. Moreover, the method may be used with a trailer that may be provided with the vehicle and that may have non-steerable, non-drive axles.

At block 100, the method may determine whether an environmental brake pad wear condition is detected or exists. An environmental brake pad wear condition may exist when an environmental contaminant may wear the friction material 52 of a brake pad assembly 44 independent of operation of a friction brake 42. More specifically, an environmental contaminant 110, represented by the arrowed lines in FIG. 2, may pass between the brake friction member 46 and the friction material 52 and rapidly wear the friction material 52 when the friction material 52 is spaced apart from or not in engagement with the brake friction member 46. As such, friction material wear may be caused by the environmental contaminant 110 and not by braking of the vehicle 10 (i.e., actuation of the brake pad assembly 44 against the brake friction member 46). If an environmental brake pad wear condition is not detected, then the method may end or return to block 100 to continue monitoring. If an environmental brake pad wear condition is detected, then the method may continue at block 102.

The determination as to whether an environmental brake pad wear condition exists may be accomplished manually, automatically, or combinations thereof.

Manual determination may be based at least one driver or operator input, which may be provided by an operator communication device 84. Examples of manually entered operator inputs that may be indicative of an environmental brake pad wear condition may include the selection of an off-road or all-wheel drive mode, selection of an off-road suspension mode, or a manual input that an environmental contaminant 110 is present. Such manually entered operator inputs may be used independently or in combination to indicate that an environmental brake pad wear condition is present.

Automatic detection or determination may be based on directly or indirectly detecting the presence of an environmental contaminant 110. Direct detection of an environmental contaminant 110 may be based on data from the environmental contaminant sensor 80 as previously discussed. Indirect detection of an environmental contaminant 110 may be based on vehicle operating attributes rather than direct detection of an environmental contaminant 110. Indirect detection may be accomplished in multiple ways and may be based on various inputs or combinations of inputs.

Indirect detection of an environmental contaminant 110 may be based at least in part on engine speed. More specifically, a higher engine speed, or engine RPM may be expected when the vehicle 10 is traveling through an environmental contaminant 110, such as an abrasive slurry like mud, sludge, or muck, due to resistance it exerts upon the vehicle 10. Such resistance may cause the engine 20 to work harder or run at a higher speed to obtain or maintain a desired vehicle speed. As such, a determination as to whether an environmental brake pad wear condition is present may be based on engine speed and vehicle speed or wheel speed. For example, threshold engine speed values or expected engine speed values may be associated with different vehicle speed or wheel speed values. Such engine speed values may be stored in a lookup table and may be based on vehicle development testing. An environmental contaminant 110 may be present when the actual engine speed exceeds the expected engine speed value associated with a detected vehicle or wheel speed. Engine speed data may be obtained from an engine speed sensor provided with the engine 20. Vehicle or wheel speed may be based on data from the speed sensor 72.

As another example, a determination as to whether an environmental brake pad wear condition is present may be based on engine speed, road or terrain grade, and vehicle load. Again, rolling resistance exerted by an environmental contaminant 110 may cause the engine 20 to work harder or run at a higher speed than would be the case if an environmental contaminant 110 was not present. Threshold engine speed values or expected engine speed values may be associated with different vehicle loads and/or road or terrain grades. Such engine speed values may be stored in a lookup table and may be based on vehicle development testing. An environmental contaminant 110 may be present when the actual engine speed exceeds the expected engine speed value associated with a detected vehicle load and grade of the road or terrain upon which the vehicle 10 is traveling. Engine speed data may be obtained from an engine speed sensor provided with the engine 20. Grade may be based on data from the inclinometer 78 or an external source as previously discussed. Vehicle load data may be provided by the vehicle load sensor 76, suspension sensor 74, manual input via the operator communication device 84, or may be a predetermined value as previously discussed.

Indirect detection of an environmental contaminant 110 may also be based on vehicle speed independent of engine speed. Rolling resistance exerted by an environmental contaminant 110 may cause the vehicle 10 to travel at a low rate of speed or a low rate of speed may be indicative of an off-road driving condition in which an environmental contaminant 110 is more likely to be present. For example, a vehicle 10 may be more likely to be driven at a relatively constant low rate of speed when driven through an abrasive slurry. Moreover, the length of time over which a low rate of speed is detected may highlight situations during which friction material 52 may be exposed to and worn by an environmental contaminant 110. As such, a determination as to whether an environmental brake pad wear condition is present may be based on vehicle speed (or wheel speed) and elapsed time. For example, a threshold speed value and elapsed time value may be based on vehicle development testing. An environmental contaminant 110 may be present when the vehicle speed (or wheel speed) is less than the threshold speed value for a predetermined or threshold period of time. Vehicle or wheel speed may be based on data from the speed sensor 72. The elapsed time during which the vehicle speed or wheel speed is less than the threshold speed value may be measured with a timer associated with the control module 60.

As another example, a determination as to whether an environmental brake pad wear condition is present may be based on vehicle speed and friction brake usage. More specifically, presence of an environmental contaminant 110 may be more likely at low vehicle speed as previously discussed. In addition, commands to brake the vehicle 10 may be less likely when an environmental contaminant 110 is present since a driver will likely want to keep the vehicle 10 moving so that the vehicle 10 does not get stuck. Moreover, infrequent braking commands may result in or be associated with unexpected wear of friction material 52 due to potential exposure to an environmental contaminant 110. As such, a determination as to whether an environmental brake pad wear condition is present may be based on vehicle speed (or wheel speed) and the elapsed time since a command to brake the vehicle 10. For instance, an environmental brake pad wear condition may be present if the vehicle or wheel speed is less than a threshold speed value and braking has not been requested (or the friction brakes 42 have not been actuated) for a predetermined period of time. Vehicle or wheel speed may be based on data from the speed sensor 72. Braking commands may be detected using the brake pedal sensor 90. The elapsed time between braking commands may be measured with a timer associated with the control module 60.

Indirect detection of an environmental contaminant 110 may be based on feedback from the suspension system. For example, the vehicle 10 may be more likely to be traveling through an environmental contaminant 110 when traveling off-road. Vehicle suspension performance attributes may indicate when the vehicle 10 or a particular wheel assembly 14 is driving off-road. For example, the vehicle 10 may be traveling off-road when high suspension travel distances are detected or high compressive loads or compressive pulses are detected due to pivoting of a wheel axle 34 with respect to a vehicle frame or chassis. As such, a determination as to whether an environmental brake pad wear condition is present may be based on the magnitude and/or frequency of suspension travel distances that exceed one or more associated threshold values and/or compressive loads that exceed an associated threshold compressive load value. Threshold values may be based on vehicle development testing. In addition, more frequent high magnitude travel distances or compressive loads may indicate that the vehicle 10 is traveling off-road as distinguished from on-road anomalies, such as driving over a pothole on a road. Suspension performance attributes may be detected or based on data from the suspension sensor 74.

Indirect detection of an environmental contaminant 110 may be based at least in part on data provided to the vehicle 10 from an external source. External data may be wirelessly transmitted to the vehicle 10 and received via the antenna 82. For example, data may be received from another vehicle in a convoy that indicates that an environmental brake pad wear condition exists. More specifically, data may be received that indicates that another vehicle is travelling through or has directly or indirectly detected an environmental contaminant 110. As another example, external data indicative of ground terrain and/or vehicle location, such as from a global positioning system, may be provided to the vehicle 10 and may indicate whether the vehicle 10 is traveling off-road and potentially through an environmental contaminant 110.

Indirect detection of an environmental contaminant 110 may also be based at least in part on data from the brake system 40 and its associated sensors.

As one example, an environmental contaminant 110 may be indirectly detected based on brake temperature. Increased brake temperature may be expected when vehicle braking is requested (due to friction between the friction material 52 and brake friction member 46). Erosion or wear of friction material 52 by an environmental contaminant 110 may increase brake temperature when vehicle braking is not requested. Thus, increased brake temperature or a brake temperature that exceeds a predetermined threshold brake temperature value may not be expected when vehicle braking is not requested or a friction brake 42 is not actuated. If a detected brake temperature exceeds a predetermined threshold brake temperature and a friction brake 42 is not actuated or has not recently been actuated, then the increase in brake temperature may be due to friction exerted by an environment contaminant 110 on the friction material 52. Brake actuation or commands to actuate the friction brake 42 may be based on data from the brake pedal sensor 90. Brake temperature data may be detected by or based on a signal from the brake temperature sensor 92.

As another example, an environmental contaminant 110 may be indirectly detected based on brake load. Brake torque or brake load may be expected when vehicle braking is requested (due to friction between the friction material 52 and brake friction member 46). Brake torque or brake load may not be expected when vehicle braking is not requested. Detection of an unexpected brake torque or brake load when vehicle braking is not requested may indicate that friction material 52 may be worn by an environmental contaminant 110. If a detected brake load exceeds a predetermined threshold brake load or predetermined threshold brake load value and a friction brake 42 is not actuated or has not recently been actuated, then the increased brake load may be due to force exerted by an environment contaminant 110 on the friction material 52. Brake actuation or commands to actuate the friction brake 42 may be based on data from the brake pedal sensor 90. Brake load data of data indicative of brake load force may be detected by or based on a signal from the brake load sensor 94.

An environmental contaminant 110 or environmental brake bad wear condition may be indirectly detected by actuating a brake pad assembly 44. As such, operating attributes of the brake system 40 may be used to determine environmental brake pad wear. Friction material wear due to an environmental contaminant 110 may occur much more rapidly than wear due to vehicle braking due to the erosive characteristics of the environmental contaminant 110 and potential continuous erosive exposure of the friction material 52 to the environmental contaminant 110 while the vehicle 10 is in motion. For instance, friction material 52 may wear or erode by over one 1 mm per kilometer under extreme conditions. The environmental contaminant 110 may be forced though the gap or clearance between the friction material 52 and brake friction member 46 when the vehicle 10 is in motion. The gap may act as a restriction that may affect the flow characteristics of the environmental contaminant 110 proximate the friction material 52 and enhance friction material wear or erosion. As such, the amount of friction material wear in a period of time may indicate an environmental brake bad wear condition. For instance, friction material wear may be evaluated based on brake pad clearance 112, which may also be referred to as the actuation distance of the brake pad assembly 44 until the friction material 52 engages the brake friction member 46. If the actuation distance exceeds a predetermined amount within a predetermined period of time, such a since a last actuation distance check, then an environmental wear condition may be present.

Brake pad clearance or actuation distance may be detected or measured based on operating attributes of the brake system 40, such as brake actuation pressure or brake pump performance attributes. For example, actuation distance may be associated with brake pressure, or the pressure of a gas or liquid that may be used to actuate a brake pad assembly 44. Brake fluid pressure may increase when the friction material 52 engages the brake friction member 46. If brake fluid pressure does not exceed a threshold brake pressure value within a predetermined period of time, then the friction material 52 may be worn or located at an unacceptable distance from the brake friction member 46. Alternatively, the rate of pressure change (brake pressure versus time or brake pressure versus actuation distance) may be used to assess brake pad clearance or actuation distance. For instance, a lookup table may be populated with predetermined limits associated with acceptable pressure, time and or distance data. If the rate of pressure change is not within predetermined limits, then the friction material 52 may be too far from the brake friction member 46 and the brake pad clearance may be adjusted. In addition, brake pump attributes may be employed. For example, if the brake pump displacement is greater than a threshold displacement value (i.e., more fluid is required than expected to actuate the friction material 52 into engagement with the brake friction member 46), then the friction material 52 may be too far from the brake friction member 46 and the brake pad clearance may be adjusted. Pump displacement may be based on the stroke length of a piston used to pump fluid. For example, if a piston stroke length exceeds a threshold value, or the piston "bottoms out" then the clearance may be unacceptable. In addition, actuation distance may be assessed based on vehicle braking distance. For example, if a detected vehicle braking distance is greater than a predetermined braking distance that is based on vehicle load and vehicle speed, then the clearance by be unacceptable. Braking distance may be based on the distance of travel of the vehicle after a brake input command is detected.

At block 102, the brake pad clearance may be checked and/or adjusted. Brake pad clearance may be checked once when an environmental brake bad wear condition is detected or a predetermined number of times or cycles after an environmental brake bad wear condition is detected. More specifically, the clearance or distance between the friction material 52 of the brake pad assembly 44 and the brake friction member 46 may be assessed and may be adjusted when the clearance exceeds a predetermined limit. Clearance between the friction material 52 and the brake friction member 46 may be assessed for particular friction brakes 42 or groups of friction brakes 42.

As one example, brake pad clearance may be checked and adjusted for a friction brake 42 or wheel assembly 14 that has been identified as being potentially exposed to an environmental contaminant 110. Accordingly, clearance may not be checked or adjusted for a friction brake 42 or wheel assembly 14 that has not been identified as being potentially exposed to an environmental contaminant 110. Identification of a friction brake 42 that may have been exposed to an environmental contaminant 110 may be based on data associated with a particular wheel assembly 14, axle assembly 24, 36, or friction brake 42. For instance, a wheel assembly 14 that has suspension performance attributes associated with off-road driving may have been exposed to an environmental contaminant 110, such as when wheel assemblies 14 on one side of a vehicle 10 are driven through a ditch and wheel assemblies 14 on an opposite side of the vehicle 10 are driven on-road. In addition, wheel slip of a particular wheel assembly 14 may indicate off-road travel of a wheel assembly 14 or exposure to an environmental contaminant 110. If multiple friction brakes 42 or wheel assemblies 14 are identified as being potentially exposed to an environmental contaminant 110, then the clearance may be checked sequentially or at different times for each friction brake 42 to reduce the potential impact on vehicle speed and/or vehicle drivability. Such friction brakes 42 may be checked in a predetermined sequence.

As another example, brake pad clearance may be checked and adjusted for groups of friction brakes 42 or wheel assemblies 14 that has been identified as being potentially exposed to an environmental contaminant 110. For instance, brake pad clearance may be checked for all friction brakes 42 on a common axle assembly having at least one friction brake 42 or wheel assembly 14 that has been identified as being potentially exposed to an environmental contaminant 110. If friction brakes 42 or wheel assemblies on multiple axle assemblies 24, 36 are identified as being potentially exposed to an environmental contaminant 110, then the clearance may be checked at different times for each axle assembly to reduce the potential impact on vehicle speed and/or vehicle drivability. Such axle assemblies may be checked in a predetermined sequence.

Brake pad clearance may be checked at different frequencies. For example, brake pad clearance may be checked and/or adjusted once whenever an environmental brake pad wear condition is detected. Alternatively, brake pad clearance may be checked and adjusted on a periodic basis after an environmental brake pad wear condition is detected or periodically, so long as such a condition continues to be detected. For example, brake pad clearance may be checked periodically based on time or distance. For example, periodic brake pad clearance checks may be executed at the predetermined time intervals, such as every three minutes. Periodic brake checks may be executed for a specific wheel assembly 14, all wheel assemblies 14, or by axle assembly as previously discussed. A periodic clearance check based on distance may be executed when the vehicle 10 travels a predetermined distance, such as every 500 feet. Such periodic checks may provide sufficient monitoring of potential brake pad wear or friction material wear while reducing the potential impact on vehicle speed and vehicle drivability.

A predetermined algorithm may be used to actuate a brake pad assembly 44 to check and/or adjust brake pad clearance. For example, the brake pad assembly 44 may be actuated such that the friction material 52 engages the brake friction member 46. The clearance or actuation distance may be compared to a threshold value. If the actuation distance is not greater than a threshold value or threshold actuation distance, then the clearance between the friction material 52 and the brake friction member 46 is acceptable. If the actuation distance is greater than the threshold value, then the clearance is not acceptable and the position of the brake pad assembly 44 may be adjusted closer to the brake friction member 46 to reduce the actuation distance to improve braking performance, such as reducing the time to engage the friction material 52 to the brake friction member 46 which may reduce vehicle braking distance.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a brake system of a vehicle comprising:
    determining with an electronic control module whether an environmental brake pad wear condition is detected when the brake system does not actuate a friction material of a brake pad assembly into engagement with a brake friction member;
    checking with the electronic control module a clearance between the friction material and the brake friction member when the environmental brake pad wear condition exists; and
    adjusting with the electronic control module a clearance between the friction material and the friction brake member when the clearance exceeds a predetermined limit.

2. The method of claim 1 wherein determination of whether the environmental brake pad wear condition is detected is based on a manual input from a vehicle operator.

3. The method of claim 1 wherein determination of whether the environmental brake pad wear condition is detected is based on data from a sensor that detects presence of an abrasive slurry.

4. The method of claim 1 wherein determination of whether the environmental brake pad wear condition is detected is based on engine speed and wheel speed.

5. The method of claim 1 wherein determination of whether the environmental brake pad wear condition is detected is based on engine speed, terrain grade, and vehicle load data.

6. The method of claim 1 wherein determination of whether the environmental brake pad wear condition is detected is based on brake temperature data indicative of wear of the friction material by an environmental contaminant.

7. The method of claim 1 wherein determination of whether the environmental brake pad wear condition is detected is based on brake load data indicative of load force exerted on the friction material by an environmental contaminant.

8. The method of claim 1 wherein determination of whether the environmental brake pad wear condition is detected is based on data from a suspension sensor indicative of the vehicle being driven off-road.

9. The method of claim 1 wherein determining whether the environmental brake pad wear condition is detected occurs when an engine of the vehicle is running and a low forward drivetrain gear ratio is engaged.

10. The method of claim 1 wherein determination of whether the environmental brake pad wear condition is detected is based on data that is wirelessly transmitted to the vehicle that is indicative of presence of an environmental contaminant.

11. A method of controlling a brake system of a vehicle comprising:
   actuating a brake pad assembly against a friction brake member of the brake system;
   determining with an electronic control module whether environmental brake pad wear is detected that is indicative of wear of a friction material of a brake pad assembly by an abrasive slurry through which the vehicle is driven; and
   adjusting with the electronic control module a clearance between the friction material and the friction brake member when the clearance exceeds a predetermined limit.

12. The method of claim 11 wherein environmental brake pad wear is detected when a vehicle braking distance is greater than a predetermined braking distance that is based on vehicle load, vehicle speed, and a brake input command.

13. The method of claim 11 wherein environmental brake pad wear is detected when a brake pad assembly actuation distance is greater than a threshold actuation distance.

14. The method of claim 13 wherein the brake pad assembly actuation distance is based on brake pressure associated with actuation of the brake pad assembly.

15. A method of controlling a brake system of a vehicle comprising:
   providing a set of friction brakes, wherein each member of the set of friction brakes brakes a different member of a set of wheel assemblies;
   determining with an electronic control module whether an environmental brake pad wear condition exists in which an abrasive slurry through which the vehicle is driven passes between a friction material and a brake friction member of a member of the set of friction brakes to wear the friction material;
   checking with the electronic control module a clearance between the friction material and the brake friction member of the member of the set of friction brakes when the environmental brake pad wear condition exists; and
   adjusting with the electronic control module a clearance between the friction material and the friction brake member when the clearance exceeds a predetermined limit.

16. The method of claim 15 further comprising identifying a member of the set of wheel assemblies that is driven through the abrasive slurry and checking the clearance between the friction material and the brake friction member for members of the set of wheel assemblies that are driven through the abrasive slurry.

17. The method of claim 15 wherein clearance between the friction material and the brake friction member is checked for members of the set of friction brakes disposed on a common axle assembly.

18. The method of claim 15 wherein clearance between the friction material and the brake friction member is checked sequentially such that members of the set of friction brakes are not actuated simultaneously.

19. The method of claim 15 wherein clearance between the friction material and the brake friction member is checked periodically based on an elapsed time when the environmental brake pad wear condition exists.

20. The method of claim 15 wherein clearance between the friction material and the brake friction member is checked periodically based on a distance travelled by the vehicle when the environmental brake pad wear condition exists.

\* \* \* \* \*